United States Patent [19]

Bayly

[11] Patent Number: 4,836,688

[45] Date of Patent: Jun. 6, 1989

[54] WHISK

[75] Inventor: Peter K. Bayly, Melbourne, Australia

[73] Assignee: Kingsley Nominees Pty. Ltd., Balwyn, Australia

[21] Appl. No.: 177,776

[22] Filed: Apr. 5, 1988

[30] Foreign Application Priority Data

Apr. 8, 1987 [AU] Australia ................................. PI1309

[51] Int. Cl.⁴ .............................................. B01F 13/00
[52] U.S. Cl. ...................................... 366/342; 366/129
[58] Field of Search ............... 366/342, 343, 325, 326, 366/329, 348, 349, 292, 297, 299, 129; 132/150, 156; 15/141.1, 141.2, 142

[56] References Cited

U.S. PATENT DOCUMENTS

| 2,661,007 | 12/1953 | Bauer | 132/150 |
| 2,805,843 | 9/1957 | Block | 366/343 |
| 3,192,934 | 7/1965 | Catania | 132/150 |

Primary Examiner—Robert W. Jenkins
Attorney, Agent, or Firm—Stevens, Davis, Miller & Mosher

[57] ABSTRACT

A whisk composed of an elongated handle and an operative section connected to one end of the handle. The operative section is composed of a plurality of blades arranged side by side in a laterally spaced relationship. Each blade has a relatively broad surface facing generally towards a corresponding surface of an adjacent blade. The blades are connected to the handle by a flexible bar which enables the blades to move to a limited degree relative to the handle.

9 Claims, 2 Drawing Sheets

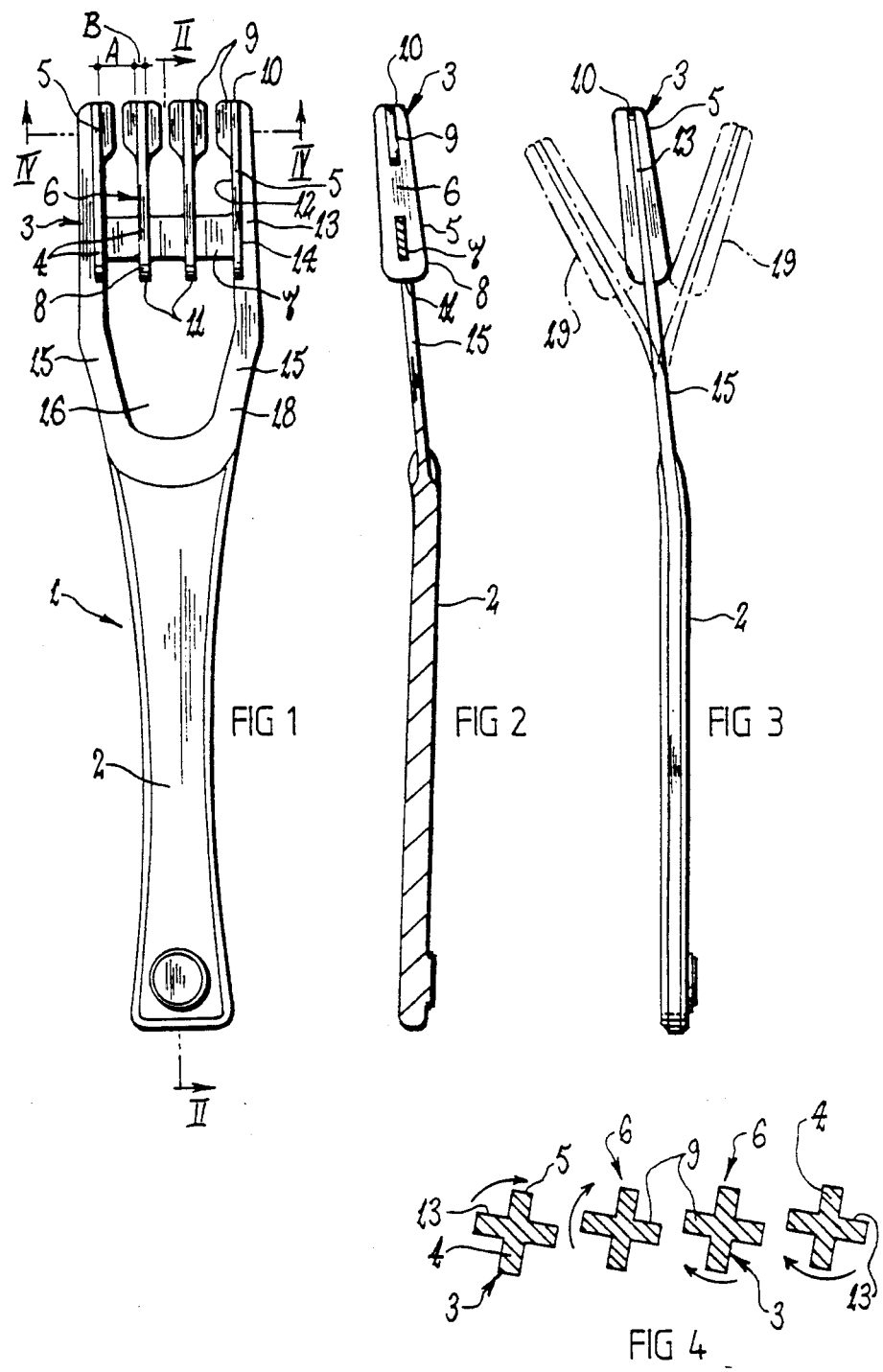

WHISK

This invention relates to kitchen implements of the kind normally referred to as whisks and which are used for beating and/or mixing a fluid substance. The invention is concerned with such implements which are used by hand rather than being motor driven.

Manually operated whisks come in a variety of forms, but there are certain aspects which are common to all forms. In particular, the operative or beating section of such whisks is formed by a plurality of closely arranged elongate elements of small cross-sectional size. Those elements are generally formed from metal wire and they are twisted, looped, and otherwise arranged to form a packed assembly.

Apart from the difficulty of manufacturing such whisks, they suffer operational and cleaning problems. The operation of such whisks is dependent upon the provision of a large number of closely spaced operational elements, each of which has a small surface area. Viscous materials tend to be picked-up by the elements rather than being caused to flow as intended. The very same constructional characteristics make it difficult to properly clean such whisks.

It is an object of the present invention to provide a hand operated whisk which is of extremely simple and yet effective form. It is a further object of the invention to provide a whisk which is effective for beating and/or mixing materials of various degrees of viscosity, and which is easy to clean.

A whisk according to the invention includes a whisk including an elongate handle, an operative section connected to one end of said handle, said operative section including a plurality of blades which are arranged side by side in laterally spaced relationship, each said blade having a relatively broad surface facing generally towards a corresponding surface of an adjacent said blade, and flexible means forming at least part of the connection between said blades and said handle whereby said blades are able to move to a limited degree relative to said handle.

It is preferred that each blade is attached to a flexible finger and optionally each finger may have a plurality of blades attached thereto, the blades being arranged angularly relative to one another. It is also preferred that each finger forms a blade in its own right. The blades preferably are spaced sufficiently far apart to permit the flow therebetween of viscous material.

Three embodiments of the invention are described in detail in the following passages of the specification which refer to the accompanying drawings. The drawings, however, are merely illustrative of how the invention might be put into effect, so that the specific forms and arrangements of the various features shown are not to be considered as limiting on the invention.

In the drawings:

FIG. 1 shows a plan view of a whisk according to the invention;

FIG. 2 shows a cross sectional side view of the whisk along line II—II of FIG. 1;

FIG. 3 shows a side view of the whisk of FIG. 1;

FIG. 4 shows a cross-sectional end view of the fingers of the whisk taken along line IV—IV of FIG. 1 whith the fingers being depicted in a stressed condition;

Figure 5:
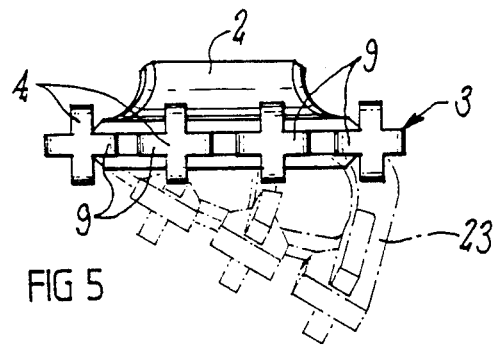
FIG. 5 shows an end view of the whisk of FIG. 1.

As shown in FIGS. 1 to 5 of the drawings a whisk 1 is moulded or otherwise formed from a suitable plastics material. That form shown includes an elongate handle 2 having an operational section 3 attached to one end thereof. Preferably, the handle 2 and the operational section 3 are formed integral so that the whisk 1 is a single piece moulding.

The operational section 3 includes a plurality of fingers 4 which are arranged in substantially parallel side by side relationship. Each finger 4 is spaced laterally from each other finger 4 by a substantial distance indicated by dimension line 'A'. Preferably, that space is substantially greater than the dimension or thickness of the finger 4 measured in the same lateral direction and indicated by dimension line 'B'. It is also preferred that each finger 4 is an elongate plate-like member which is arranged edge on so that the broad side surfaces 6 of adjacent fingers 4 are in opposed relationship.

A connecting bar 7 extends transversely between adjacent fingers 4 so as to interconnect the fingers 4 at one end 8, which will be hereinafter referred to as their inner ends. At least one blade 9 is connected to or formed at the distal or free end 10 of each finger 4. Preferably, that blade 9 is a plate-like element which projects angularly outwards from a broad side surface 6 of the respective finger 5.

In the arrangement shown in the drawings there are four fingers 5 aligned in a plane. The two innermost fingers 11 preferably have a blade 9 formed on each broad side surface 6 thereof, and each blade 9 projects outwardly from the respective side surface at an angle of substantially 90°. Each blade 9 may be of substantially rectangular form and preferably extends for less than one half the length of the associated finger 4. As will be apparent from the following description, the relatively broad surfaces 6 of each finger 4 also function as blade surfaces.

A blade 9 as described above may be formed on the side 12 of each outer finger 5 which is adjacent one of the inner fingers 11. Another blade 13 is preferably provided on the opposite side 14 of each outer finger 5, but in this case that blade 13 extends the full length of the finger 5 and may be an extension of an arm 15 through which the operational section 3 is connected to the handle 2 of the whisk. That is, there are two arms 15 which are laterally spaced to form an opening 16 therebetween and which are connected at one end to the handle 2 and at the opposite end to the operational section 3.

Each connecting arm 15 may also be of plate-like form and arranged so that their broad surfaces 18 are substantially at right angles to the broad surfaces 6 of the fingers 4. The connecting bar 7 of the operational section 3 may also be of plate-like form and arranged with its broad surfaces lying in substantially the same plane as the broad surfaces 18 of the arms 15.

It will be appreciated from the foregoing that each finger 4 together with its associated blades 9 form a cruciform appearance when viewed end on and as best seen in FIG. 4. It will also be apparent that the cross-sectional shape of each finger 4 is such that the finger 4 is able to twist about its longitudinal axis. The fingers 4 are shown in FIG. 4 in this twisted configuration. Furthermore, the inner fingers 11 have a propensity to bend laterally towards the adjacent fingers 5 or 11. The connecting arms 15 on the other hand have a propensity to bend in a direction at right angles to the direction of lateral bending of the fingers 4. As seen in FIG. 5 of the drawings, the arms 15 are sufficiently flexible yet resilient to allow the whole operational section 3 to twist angularly up to about 45° out of its rest position. Dotted lines 19 in FIG. 3 indicate the flexed positions of the operational section 3. Dotted lines 23 in FIG. 5 indicate a flexed position the operational section may adopt when the whisk is operated in a bowl in which fluid to be whisked is located.

An arrangement of the foregoing kind is dynamic in that movement of the operational section through a fluid body results in bending, twisting and possibly vibratory movement of components of that operational section 3. Such ancillary movement results from the flexible nature of the fingers 4 and arms 15 and further from the fact that broad surfaces of the operational section are moved against the fluid body. The ancillary movement of the fingers 4 and arms 15 increases the ability of the whisk 1 to effectively beat or mix the fluid body in which it is used. As shown in FIG. 4, the fingers are capable of twisting about their longitudinal axis during use of the whisk.

Effective operation of the whisk 1 is further improved by the relatively large openings between adjacent fingers 4 through which material can flow. A large opening 16 is also provided between the connecting arms 15. Furthermore, the various plate-like sections of the whisk 1 may have relatively sharp edges so as to assist in breaking-up the fluid body through which the whisk 1 is moved.

Figure 6:
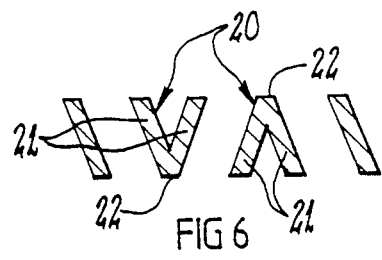
FIG. 6 shows a cross-sectional end view of a second embodiment of whisk taken along a line similar to that of FIG. 4.

Clearly the blades 9 and fingers 4 need not adopt the configuration depicted in FIGS. 1 to 5 of the drawings. As shown in FIG. 6, for example, inner fingers 20 have a substantially V-shaped cross-section defined by two blade elements 21 joined together along a common edge 22 and angularly aligned relative to one another. The two inner fingers are inverted relative to each other.

Figure 7:
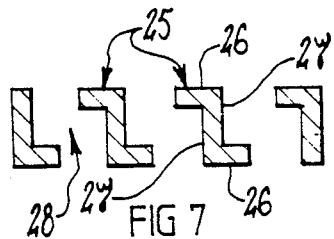
FIG. 7 shows a similar view to that of FIG. 6 of a third embodiment of whisk.

The blades and finger arrangement shown in FIG. 7 is also different. In this arrangement each inner finger 25 has a blade 26 attached to the upper and lower edge thereof on opposite sides of the broad surfaces 27 of that finger. The resultant form is of substantially Z-shaped configuration, and the spaces 28 between adjacent fingers 25 are sufficiently large to allow a reasonable flow of fluid therebetween.

Clearly, both the FIGS. 6 and 7 arrangements are suitable to be formed from plastics material using conventional moulding techniques.

A whisk 1 according to the invention is distinguished over prior whisks in that it utilises a small number of components of relatively large surface area located in relatively widely spaced relationship. Prior whisks on the other hand utilise a large number of components of small surface area located in closely spaced relationship. Furthermore, an implement according to the invention can be manufactured easily and at a low cost.

Finally, it is to be understood that various alterations, modifications and/or additions may be introduced into the constructions and arrangements of parts previously described without departing from the spirit or ambit of the invention as defined in the appended claims.

Having now described our invention what we claim as new and desire to secure by Letters Patent is:

1. A whisk comprising an elongate handle, an operative section and a flexible means connecting said operative section to one end of said handle, said operative section including a plurality of blades which are arranged side by side in laterally spaced relationship, each said blade having a relatively broad surface facing generally towards a corresponding broad surface of an adjacent said blade, the thickness of said blades measured in a direction perpendicular to said broad surfaces being small compared with the distance said blades are spaced apart so as to permit the flow of viscous material between said blades, said blades being in the form of fingers each having a distal end, said fingers being joined together at a position remote from their distal ends, said fingers having further blades formed on the distal ends thereof arranged angularly relative to the broad surfaces of the fingers, flexible means forming at least part of the connection between said blades and said handle whereby said blades are able to move to a limited degree relative to said handle.

2. The whisk according to claim 1 wherein at least some of the fingers are flexible.

3. The whisk according to claim 1 wherein the handle is in the form of a substantially flat elongate strip and the fingers are oriented parallel to each other and in line with the longitudinal axis of the handle, and the broad surfaces of the fingers are perpendicular to the plane of the flat strip.

4. The whisk according to claim 1 wherein the flexible means comprises a pair of arms joining the operative section to the handle, said arms being spaced apart such that an opening is defined therebetween.

5. A whisk comprising an elongate handle, an operative section and a flexible means connecting said operative section to one end of said handle, said operative section including a plurality of blades in the form of fingers which are arranged side by side in laterally spaced relationship, each said blade having a relatively broad surface facing generally towards a corresponding surface of an adjacent said blade, said flexible means comprising a pair of arms spaced apart such that an opening is defined therebetween, said flexible means permitting said operative section to move to a limited degree relative to said handle.

6. The whisk according to claim 5 wherein the space between the adjacent said broad surfaces is relatively large to permit viscous material to flow therebetween.

7. The whisk according to claim 5 formed of a suitable plastics material in a single piece moulding.

8. The whisk according to claim 5 wherein the operative section is comprised of a plurality of blade elements arranged angularly relative to one another.

9. The whisk according to claim 8 wherein the blades have a V-shape in cross-section.

* * * * *